US012619478B2

(12) United States Patent
Kanvar et al.

(10) Patent No.: US 12,619,478 B2
(45) Date of Patent: May 5, 2026

(54) AUTOMATICALLY IDENTIFYING APPLICATION PROGRAMMING INTERFACES BASED ON APPLICATION ARTIFACTS

(71) Applicant: INTERNATIONAL BUSINESS MACHINES CORPORATION, Armonk, NY (US)

(72) Inventors: Vini Kanvar, New Delhi (IN); Srikanth Govindaraj Tamilselvam, Chennai (IN); Keerthi Narayan Raghunath, Bangalore (IN); Alex Mathai, Mumbai (IN); Saravanan Krishnan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 536 days.

(21) Appl. No.: 18/177,228

(22) Filed: Mar. 2, 2023

(65) Prior Publication Data

US 2024/0296078 A1 Sep. 5, 2024

(51) Int. Cl.
*G06F 9/54* (2006.01)
*G06F 8/72* (2018.01)

(52) U.S. Cl.
CPC . *G06F 9/54* (2013.01); *G06F 8/72* (2013.01)

(58) Field of Classification Search
CPC ........................................................ G06F 9/54
See application file for complete search history.

(56) References Cited

U.S. PATENT DOCUMENTS

| | | | | |
|---|---|---|---|---|
| 6,442,751 | B1 * | 8/2002 | Cocchi ................ | G06F 11/3636 717/133 |
| 10,216,548 | B1 * | 2/2019 | Zhang ........................ | G06F 9/54 |
| 10,303,532 | B1 * | 5/2019 | Engers ................ | G06F 9/45533 |
| 10,437,634 | B1 * | 10/2019 | Chiang ................. | G06F 9/5027 |
| 11,360,877 | B2 | 6/2022 | Lin et al. | |

(Continued)

OTHER PUBLICATIONS

IBM, "IBM Mono2Micro Overview," https://www.ibm.com/docs/en/mono2micro?topic_mono2micro-overview, Dec. 8, 2022, pp. 1-6.

(Continued)

*Primary Examiner* — Lewis A Bullock, Jr.
*Assistant Examiner* — Christian M Bakhit
(74) *Attorney, Agent, or Firm* — Elliot J. Shine, Esq.; Blanche E. Schiller, Esq.; Heslin Rothenberg Farley & Mesiti P.C.

(57) ABSTRACT

One or more application programming interfaces to be implemented for an application are automatically identified. The automatically identifying includes determining within the application one or more artifacts to be implemented as the one or more application programming interfaces. For an artifact of the one or more artifacts, one or more requests of the artifact are determined. The one or more requests are part of an application programming interface signature for an application programming interface identified based on the artifact. For an application programming interface identified based on the artifact, one or more definitions are generated. The one or more definitions include one or more definitions for the one or more requests of the artifact.

20 Claims, 7 Drawing Sheets

(56) References Cited

U.S. PATENT DOCUMENTS

| 11,736,525 | B1 * | 8/2023 | Rungta | H04L 41/0806 726/1 |
|---|---|---|---|---|
| 2005/0273757 | A1 * | 12/2005 | Anderson | G06F 8/75 717/100 |
| 2015/0077326 | A1 * | 3/2015 | Kramer | G06F 3/0346 345/156 |
| 2017/0206119 | A1 | 7/2017 | Zhang et al. | |
| 2018/0253342 | A1 * | 9/2018 | Gopalakrishnan | G06F 9/541 |
| 2020/0142965 | A1 | 5/2020 | Weldemariam et al. | |
| 2021/0271460 | A1 * | 9/2021 | Jaeger | G06F 8/4441 |
| 2022/0083334 | A1 * | 3/2022 | Xiao | G06F 8/315 |

OTHER PUBLICATIONS

IBM, "IBM Application Discovery and Delivery Intelligence—Overview," https://www.ibm.com/products/app-discovery-and-delivery-intelligence, downloaded from internet Jan. 31, 2023, pp. 1-5.

Puri, Ruchir, "IBM Research Pioneers Technologies Behind New AI for IT Capabilities," May 5, 2020, pp. 1-7.

IBM, "CB12: General Insurance Application (GENAPP) for IBM CICS TS," Mar. 6, 2019, pp. 1-5.

No Author, "API Enablement and COBOL Code Refactoring", https://web.archive.org/web/20230206000808/ https://www.microfocus.com/en-us/assets/application-modernization-and-connectivity/api-enablement-and-cobol-code-refactoring, Feb. 6, 2023, 3 pages.

* cited by examiner

100

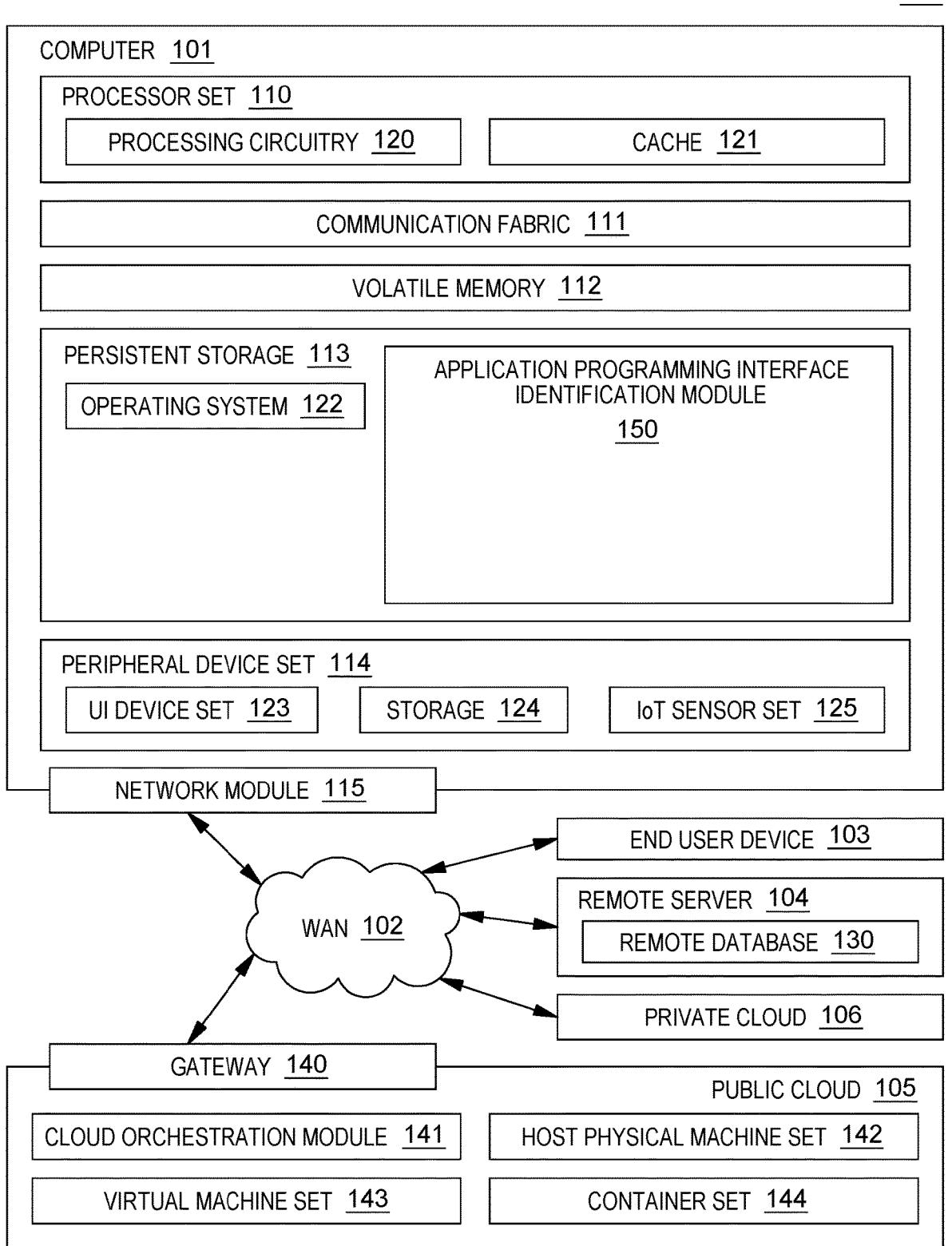

COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

APPLICATION PROGRAMMING INTERFACE IDENTIFICATION MODULE
150

PERIPHERAL DEVICE SET 114

UI DEVICE SET 123

STORAGE 124

IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

AUTOMATICALLY IDENTIFYING APPLICATION PROGRAMMING INTERFACES BASED ON APPLICATION ARTIFACTS

BACKGROUND

One or more aspects relate, in general, to facilitating processing within a computing environment, and in particular, to facilitating processing relating to computer applications.

A computer application, also referred to as an application, computer program or program, as examples, may be written as a monolithic application that is designed as a single service, or as a modular application that is designed as multiple services. A monolithic application is a single application that may include multiple functions encapsulated as one application, while a modular application includes a plurality of independent modules that may be independently used, maintained and/or replaced.

At times, a monolithic application is converted into a modular application. As an example, a monolithic application is refactored into a microservices application, in which the microservices application is arranged as a collection of loosely coupled independent services that communicate through lightweight protocols. As part of the refactoring, new application programming interfaces (APIs) are to be identified to enable users to employ the independent modules.

For monolithic applications written in certain programming languages, such as COBOL, as well as others, identifying the application programming interfaces is difficult, since, for example, the program file names may not carry semantic meaning and functions are invoked through common data structures.

SUMMARY

Shortcomings of the prior art are overcome, and additional advantages are provided through the provision of a computer-implemented method of facilitating processing within a computing environment. The computer-implemented method includes automatically identifying, using a computing device of the computing environment, one or more application programming interfaces to be implemented for an application. The automatically identifying includes determining within the application one or more artifacts to be implemented as the one or more application programming interfaces. For an artifact of the one or more artifacts, one or more requests of the artifact are determined. The one or more requests are part of an application programming interface signature for an application programming interface identified based on the artifact. For the application programming interface identified based on the artifact, one or more definitions are generated. The one or more definitions include one or more request definitions for the one or more requests of the artifact.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1 depicts one example of a computing environment to incorporate and use one or more aspects of the present invention;

FIG. 5 depicts one example of further details of using static analysis to determine requests/responses of a code block, in accordance with one or more aspects of the present invention.

DETAILED DESCRIPTION

Figure 2:
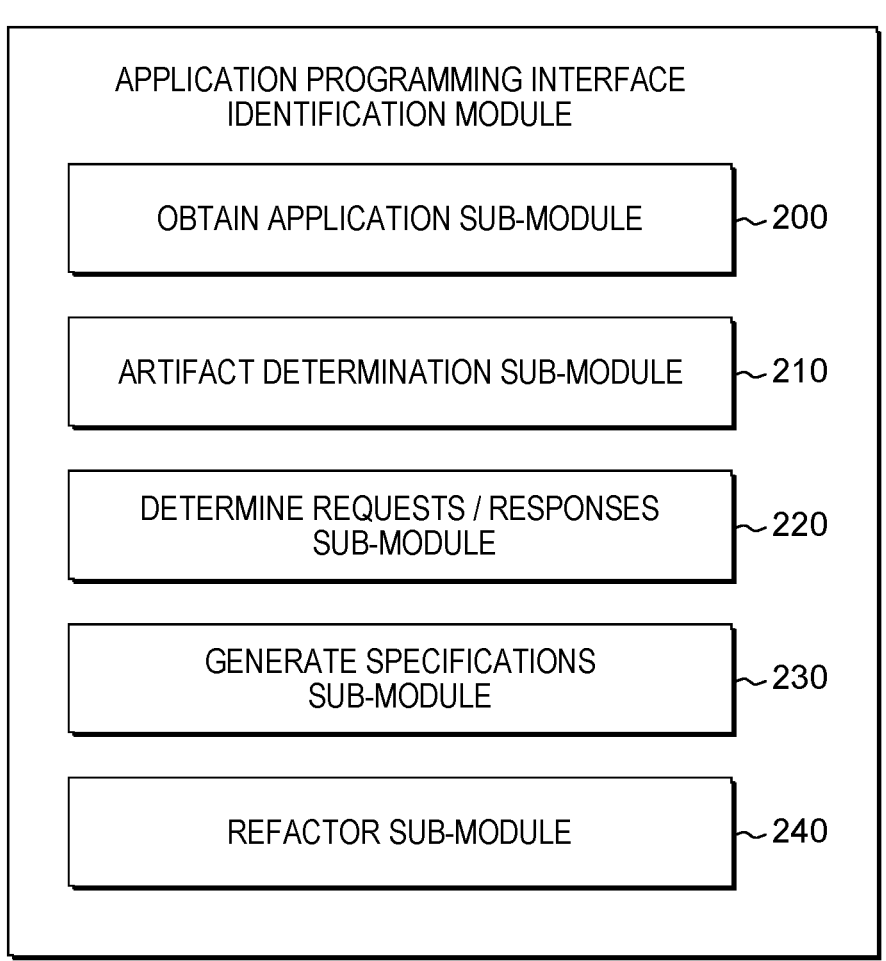
FIG. 2 depicts one example of sub-modules of an application programming interface identification module of FIG. 1, in accordance with one or more aspects of the present invention.

In accordance with one or more aspects, a capability is provided to facilitate processing within a computing environment. In one or more aspects, the capability includes identifying application programming interfaces (APIs) to be implemented for an application based on one or more identified artifacts of the application. As examples, the artifacts include transactions, procedures, inter-microservices calls, output from application insight or design tools, rules (e.g., business rules, standards, other rules, etc.), screens, client requirements, external applications and/or data access, etc. Additional, fewer and/or other artifacts may be identified.

In one or more aspects, the application programming interfaces to be implemented for an application are identified automatically by one or more computing devices, instead of manually. For instance, the application is analyzed using the one or more computing devices to automatically identify (e.g., by one or more computing devices, instead of manually) one or more artifacts of the application to be exposed or implemented as one or more application programming interfaces.

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., automatically identifies application programming interfaces to be implemented for an application, and/or performs one or more other aspects of the present invention. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 1. In one example, a computing environment 100 contains an example of an environment for the execution of at least some of the computer code involved in performing the inventive methods, such as application programming interface identification code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Other variations are possible.

In one or more aspects, an application programming interface identification module (e.g., application programming interface identification module 150) is used to automatically identify application programming interfaces of an application based on identified artifacts of the application. An application programming interface identification module (e.g., application programming interface identification module 150) includes code or instructions used to perform application programming interface identification processing, in accordance with one or more aspects of the present invention. An application programming interface identification module (e.g., application programming interface identification module 150) includes, in one example, various sub-modules to be used to perform the processing. The sub-modules are, e.g., computer readable program code (e.g., instructions) in computer readable media, e.g., storage (storage 124, persistent storage 113, cache 121, other storage, as examples). The computer readable media may be part of a computer program product and the computer readable program code may be executed by and/or using one or more computing devices (e.g., one or more computers, such as computer(s) 101; one or more servers, such as remote server(s) 104; one or more processors or nodes, such as processor(s) or node(s) of processor set 110; processing circuitry, such as processing circuitry 120 of processor set 110; and/or other computing devices, etc.). Additional and/or other computing devices, computers, servers, processors, nodes and/or processing circuitry may be used to execute one or more of the sub-modules and/or portions thereof. Many examples are possible.

One example of application programming interface identification module 150 is described with reference to FIG. 2. In one example, application programming interface identification module 150 includes an obtain application sub-module 200 to obtain (e.g., receive, be provided, retrieve, fetch, etc.) an application, such as a monolithic application, for which one or more application programming interfaces are to be identified (e.g., automatically); an artifact determination sub-module 210 to identify (e.g., automatically) one or more artifacts of the application to be implemented as one or more application programming interfaces; a determine requests/responses sub-module 220 to determine requests/responses of code of the one or more artifacts; a generate specifications sub-module 230 to generate specifications for workflows of the identified application programming interfaces and/or the determined requests/responses; and a refactor sub-module 240 to refactor caller (also referred to as calling) code to call the application programming interfaces. Additional, fewer and/or other sub-modules may be provided and/or used in one or more aspects of the present invention.

The sub-modules are used, in accordance with one or more aspects of the present invention, to identify (e.g., automatically) one or more application programming interfaces to be implemented for an application, such as a monolithic application, as further described with reference to FIG. 3. In one example, an application programming interface identification process (e.g., an application programming interface identification process 300) is implemented using one or more of the sub-modules (e.g., sub-modules 200-240) and is executed by one or more computing devices (e.g., one or more computers (e.g., computer(s) 101, other computer(s), etc.), one or more servers (e.g., server(s) 104, other server(s), etc.), one or more processor(s), node(s) and/or processing circuitry, etc. (e.g., of processor set 110 or other processor sets), and/or other computing devices, etc.). Although example computing devices, computers, servers, processors, nodes and/or processing circuitry are provided, additional, fewer and/or other computers, servers, processors, nodes, processing circuitry and/or computing devices may be used for the application programming interface identification process and/or other processing. Various options are possible.

Figure 3:
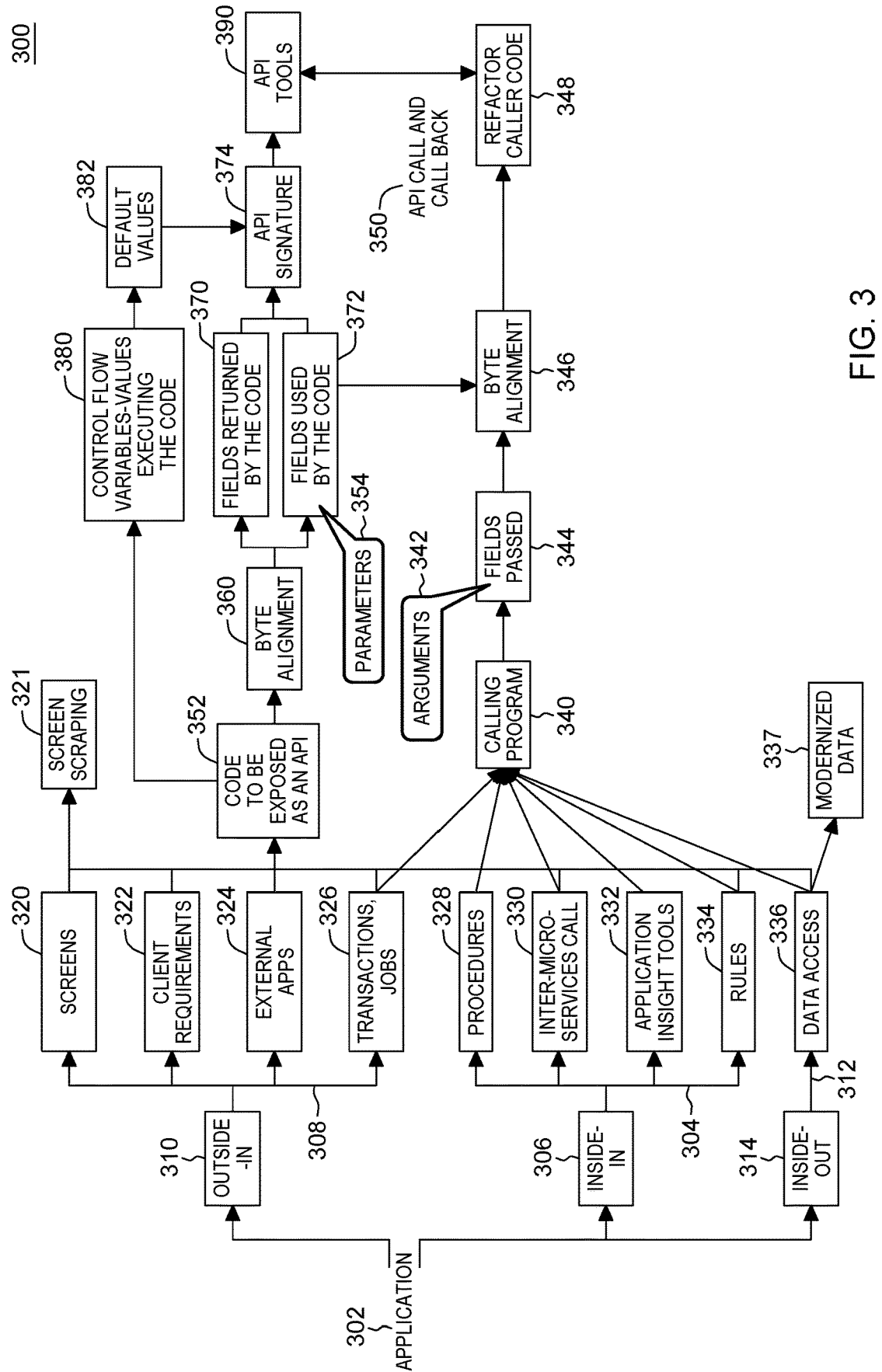
FIG. 3 depicts one example of an application programming interface identification process, in accordance with one or more aspects of the present invention.

Referring to FIG. 3, in one example, application programming interface identification process 300 (also referred to herein as process 300) identifies (e.g., automatically) one or more application programming interfaces to be implemented for an application. The identifying includes, for instance, determining (e.g., automatically) one or more artifacts to be implemented as one or more application programming interfaces. Process 300 analyzes code of the one or more artifacts to determine requests/responses of the code. Process 300 generates a specification for the identified application programming interfaces including a definition file for the code and schema definitions for the determined requests/responses. Further, process 300 refactors the caller code of the application to call the application programming interfaces. Each of these aspects is further described below.

In one example, application programming interface identification process 300 obtains an application 302, such as a monolithic application (e.g., written in COBOL or another programming language), for which application programming interfaces are to be identified. Application 302 includes a plurality of artifacts including, for instance, one or more artifacts 304 internal 306 to and/or associated with a design or construct of the application; one or more artifacts 308 external 310 to the application but associated therewith; and/or one or more artifacts 312 accessed 314 by the application. Additional, fewer and/or other artifacts may be identified and/or used in one or more aspects of the present invention.

Process 300 analyzes the application (e.g., code, constructs, control flow and/or files, as examples, of an application (e.g., application 302)) to determine (e.g., automatically) one or more artifacts to be identified and/or implemented as one or more application programming interfaces. As examples, the analysis may determine that one or more of the following artifacts are to be identified and/or implemented as application programming interfaces: screens 320 that include, e.g., menus to control aspects of the application; one or more client requirements for the application 322; one or more external applications 324 that call the application; one or more transactions or jobs 326 that call and/or are included in the application; one or more procedures 328 of the application; one or more inter-microservices calls 330 within the application; output of one or more application insight tools 332 that provide analysis, interdependencies and/or services of the application; one or more rules 334 of the application, such as business rules or other rules to develop the application that may be extracted as services; and/or data access 336 that accesses data (e.g., modernized data 337 or other data) for the application. Additional, fewer and/or other artifacts may be identified and/or used in one or more aspects of the present invention.

To further explain, as an example, process 300 analyzes the code, constructs, control flow and/or files, as examples, of the application (e.g., application 302) searching for artifacts, such as, e.g., procedures that may be identified as application programming interfaces. For instance, process 300 searches the application and based on, for instance, programming constructs, names and/or other information (which may depend on the programming language used to develop the application) locates one or more procedures (assuming the application includes procedures). Each located procedure (or a subset of such procedures) is analyzed to determine whether it may be identified and/or implemented as an application programming interface. For example, if a procedure located within the application is a standalone procedure (e.g., it does not call another procedure), then it is likely to perform single functionality (e.g., a business function) for an entity, and therefore, it may be identified as an application programming interface. Further, for a procedure that performs various functionality (e.g., business functions), such as, e.g., accesses tables with user information, performs checks, e.g., validation, etc., populates selected locations and/or performs updates, each of the functions of the procedure may be identified as an application programming interface. Other examples are possible. Further, other techniques for determining procedures to be identified as application programming interfaces are also possible.

As another example, process 300 analyzes the application (e.g., application 302) for data access code. As examples, process 300 searches for code that performs database or file accesses (e.g., queries); code before the accesses that loads the variables; and code after the accesses that perform error handling, each of which may be identified as an application programming interface.

As a further example, process 300 analyzes text files or other files associated with screens (e.g., screens 320) of the application. For instance, process 300 parses screen positions specified in a text file, and therefrom, infers fields used for functionality. Functionalities specified in a screen may be implemented as application programming interfaces. Further, in one or more aspects, process 300 determines functionality from screen scraping 321 and/or screen scraping 321 may be automated by implementing application programming interfaces. Screen scraping is a process of collecting screen display data from one application and translating it so that another application can display it. This is performed, for instance, to capture data from a legacy application to display it using a more modern user interface. Screen scraping may create application programming interfaces with code (e.g., pre-processes, validation checks, formatting, etc.) that may not be necessary to achieve the functionality of an application programming interface. Thus, that extraneous code may be extracted out or included in if-else conditions so that it is not executed for the application programming interface. Other variations are possible.

As yet another example, process 300 analyzes, for instance, the code, constructs, control flow and/or files of the application (e.g., application 302) looking for transactions that, e.g., call this application and/or transactions used by this application. For instance, process 300 searches the application and based on, e.g., programming constructs, names and/or other information (which may depend on the programming language used to develop the application) locates one or more transactions (assuming the application is called by and/or includes transactions). Each located transaction (or a subset of such transactions) is identified as an application programming interface.

Similarly, process 300 performs analysis of the application (e.g., code, constructs, control flow and/or files, etc.) to determine other artifacts to be identified as application programming interfaces. For instance, process 300 searches for programming calls (e.g., inter-microservice calls) within the application, and one or more of those programming calls are identified as application programming interfaces. Other analysis and/or artifacts may also be identified as application programming interfaces, as indicated herein.

One or more of the artifacts are input to and/or are part of a calling program 340. For instance, transactions/jobs 326, procedures 328, inter-microservices calls 330, output of application insight tools 332, rules 334 and/or data access 336 may be input to and/or part of a calling side of application 302, referred to as calling program 340. Additional, fewer and/or other artifacts may be input to and/or part of a calling program.

For calling program 340, process 300 determines one or more arguments 342 of the program. Arguments 342 are, for example, data, including values of fields 344, passed from calling program 340 to a called program (also referred to as a callee program). A called program is, for example, code 352 of an artifact (also referred to as a code block) exposed as an application programming interface of application 302. The code includes, for instance, fields used by the code and these fields are referred to as parameters 354 of the called code.

Process 300 performs a byte alignment 346 on arguments 342 and parameters 354, such that the arguments of the caller program are mapped to the parameters of the called program providing an indication of the data structure(s) being sent and received.

Process 300 performs refactoring 348 of the caller code to modify the code such that it calls 350 the application programming interfaces to be implemented based on the identified artifacts, instead of the original code. For instance, calls in application 302 (e.g., calling program 340) are refactored to call communication stubs of a connect tool (e.g., IBMR z/OSR Connect, offered by International Business Machines Corporation, and/or other tools from International Business Machines Corporation and/or other companies; aspects of the present invention are not limited to any particular connect tool). The communication stubs are used to call the implemented application programming interfaces. IBMR and z/OSR are trademarks or registered trademarks of International Business Machines Corporation in at least one jurisdiction.

As indicated, for an identified artifact, code 352 of the artifact is to be exposed as code of an application programming interface. As examples, code for one or more of screens 320, client requirements 322, external applications 324, transactions/jobs 326, procedures 328, inter-microservices call 330, output of application insight tools (e.g., identified services) 332, rules 334 and/or data access 336 may be exposed as application programming interfaces. In other embodiments, code for additional, fewer, and/or other artifacts may be exposed as application programming interfaces. Examples of exposing the code for identified artifacts are further described below.

For instance, code that performs database or file accesses, code before the accesses that loads the variables and code after the accesses that performs error handling may be exposed as application programming interfaces. As examples, data application programming interfaces may be exposed in the following situations: Fixed queries—an application programming interface is implemented with a fixed query through a connect tool-allows additional data services; Dynamic queries—enables a user to input query statements as a parameter to the application programming interface—this employs data virtualization using a database connectivity connection and provides a data interface. In this example, one or more application programming interfaces are identified, application programming calls are included in the calling program (e.g., program 340) and the code is exposed (e.g., code 352), such that it may be called by the calling program.

As a further example, code used to develop and/or use screens (e.g., screens 320) and/or to display screen data may be exposed. That is, the code may be determined and placed in, e.g., a code block callable as an application programming interface.

Further, code of an identified procedure (e.g., standalone procedure or function of a multi-function procedure) may be exposed as an application programming interface. Many other examples exist and are possible.

For each code block of an artifact identified as an application programming interface, process 300 performs byte alignment 360 on that code to identify the data structure(s) being sent and the data structure(s) being received. For instance, a code block is analyzed for calls and based on locating a call, byte alignment is performed to determine how information is being transferred between applications.

Further, in one embodiment, process 300 traverses the code (e.g., code 352) to determine one or more fields returned by the code 370 and one or more fields used by the code 372 (e.g., parameters 354). This is, e.g., separate from any byte alignment that may be performed. For instance, process 300 identifies (e.g., automatically) requests and responses of a code block of an artifact, including request fields (e.g., fields 372) and response fields (e.g., fields 370). As described herein, these fields, which are part of an application programming interface signature 374 for the application programming interface identified based on the artifact, are automatically identified using one or more techniques described further below.

Further, in one or more aspects, process 300 determines 380 control flow variables/values of each code block 352 (or selected code blocks) of identified artifacts. For instance, process 300 determines the one or more conditions under which the code block is executed. This produces one or more default values 382 (e.g., values of the conditions) that are used in the application programming interface signature 374.

Process 300 inputs the application programming interface signatures, which specify, e.g., what needs to be defined for an application tool to define an application programming interface (e.g., a REST (Representational State Transfer) application programming interface) into one or more application programming interface tools 390. In one example, tool 390 generates a specification that defines the identified application programming interfaces and includes a schema for the identified response/request blocks. One example of an application programming interface tool that is used is Swagger, which is provided as an application programming interface toolkit of, e.g., z/OS Connect; however, this is only one example. Any Swagger toolkit or service or any other tool or service may be used to generate the specification and/or schemas.

As described above, in one or more aspects, to implement one or more application programming interfaces, requests and responses are identified (e.g., automatically) from the code blocks (e.g., code blocks 352). For example, process 300 analyzes a code block for requests/responses. As examples, a variable of a code block is a request variable if it is only read (and not written) in the code block, and a variable is a response variable if it is only written (and not read) in the code block. If a variable is both read and written in the code block, then the variable may or may not be a request or a response. A user, for instance, may confirm whether such a variable is a request and/or a response and/or automated or prediction techniques (e.g., artificial intelligence) may be used. Various options are possible.

To identify requests and responses, in one example, process 300 performs analysis, such as static program analysis, in one example, to identify the requests and/or responses. This static program analysis may be flow-insensitive/flow-sensitive/path-sensitive, as described herein. Further, for program calls in the code blocks, call chain analysis may be used. Moreover, argument to parameter mapping is performed for program calls to find read/written variables across programs. In the case of cyclic calls, fix point computation may be performed, in one example. Although various techniques are described for identifying requests/responses, additional, fewer and/or other techniques may be used. Many options are possible.

Figure 4:
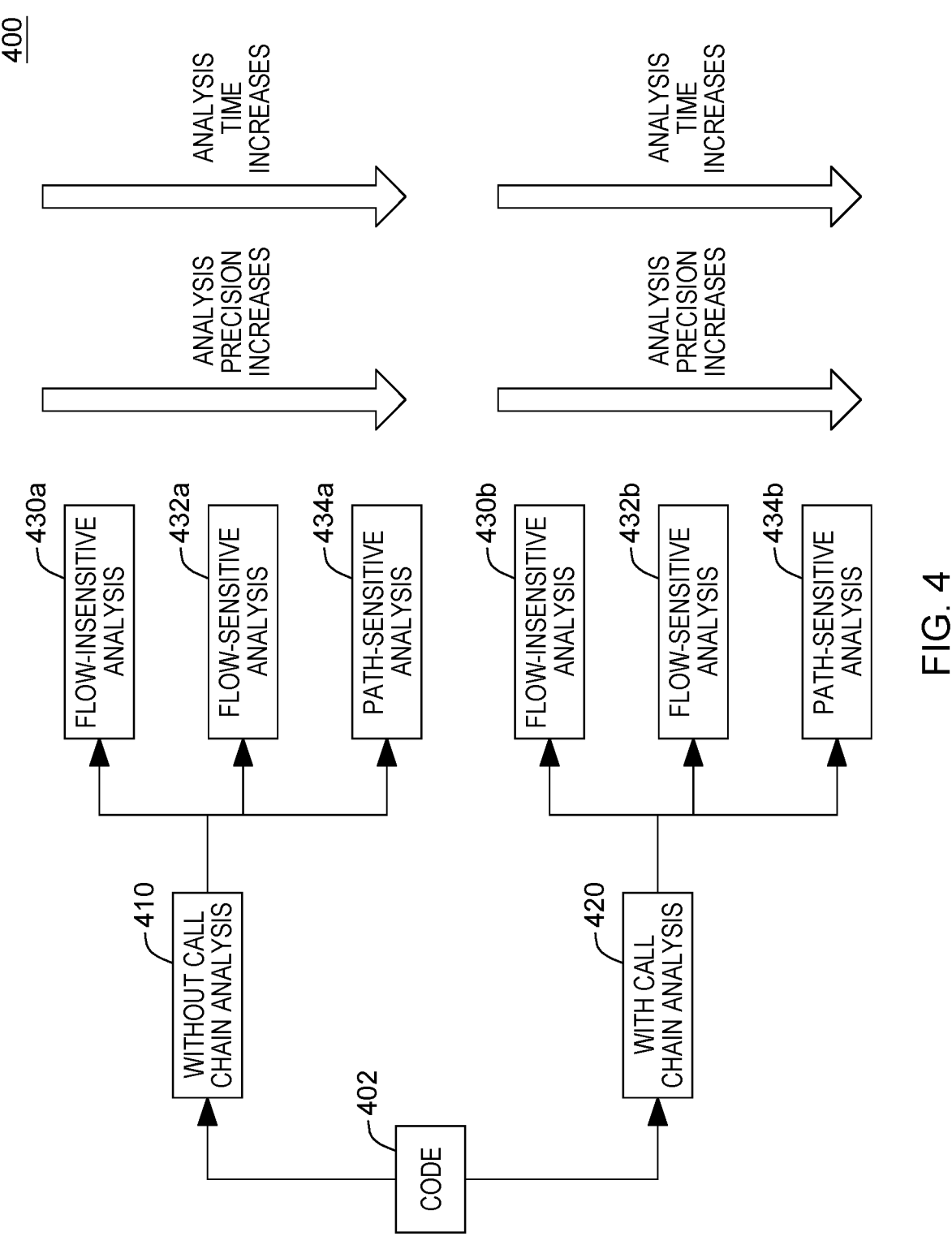
FIG. 4 depicts one example of an overview of using static analysis to determine requests/responses of a code block, in accordance with one or more aspects of the present invention.

One example of static analysis to find requests/responses of a code block is described with reference to FIG. 4. In one example, an analysis process (e.g., an analysis process 400) is used. This process may be implemented using a sub-module (e.g., determine requests/responses sub-module 220 and/or additional, other sub-modules) and is executed by one or more computing devices (e.g., one or more computers (e.g., computer(s) 101, other computer(s), etc.), one or more servers (e.g., server(s) 104, other server(s), etc.), one or more processor(s), node(s) and/or processing circuitry, etc. (e.g., of processor set 110 or other processor sets), and/or other computing devices, etc.). Although example computing devices, computers, servers, processors, nodes and/or processing circuitry are provided, additional, fewer and/or other computers, servers, processors, nodes, processing circuitry and/or computing devices may be used for the analysis process and/or other processing. Various options are possible.

In one example, analysis process 400 (also referred to as process 400) obtains code 402 to be exposed as an application programming interface (e.g., code 352). Process 400 selects, in one embodiment, an analysis technique to be used to search the code for requests/responses. As examples, process 400 may select a static analysis without call chain analysis technique 410 or a static analysis with call chain analysis technique 420. In one example, call chain analysis is not used when the application (e.g., monolithic application 302) has one type of program calls, e.g., clean program calls, in which requests are in preceding lines of code and responses in succeeding lines of code. In contrast, call chain analysis is used, for example, when the application has another type of program calls, e.g., not clean program calls (e.g., requests and responses are spread throughout the application and may even be inside called programs).

Regardless of whether the static analysis is used with call chain analysis, the analysis may be one of several types, including, but not limited to, flow-insensitive analysis 430a, 430b, which does not consider the order of statements in an application (e.g., variables x and y may refer to the same location); flow-sensitive analysis 432a, 432b, which considers the order of statements in an application (e.g., after statement n, variables x and y may refer to the same location); and path-sensitive analysis 434a, 434b, which computes different pieces of analysis information dependent on the predicates at conditional branch instructions of the application. Additional, fewer and/or other types of analysis may be performed.

The different types of analysis offer different precision. For instance, flow-insensitive analysis, which finds read fields throughout a block of code, is less precise than flow-sensitive analysis but easy to implement and fast to compute. Flow-sensitive, which finds read fields per statement, propagates read fields backwards, and propagates over loops and recursive calls until read fields are marked at the reachable statements, is more precise. However, it may be time-consuming and complex to implement. Flow-insensitive and flow-sensitive analyses are less precise than path-sensitive analysis. As the preciseness increases, so does the analysis time and/or complexity, typically.

Figure 5:
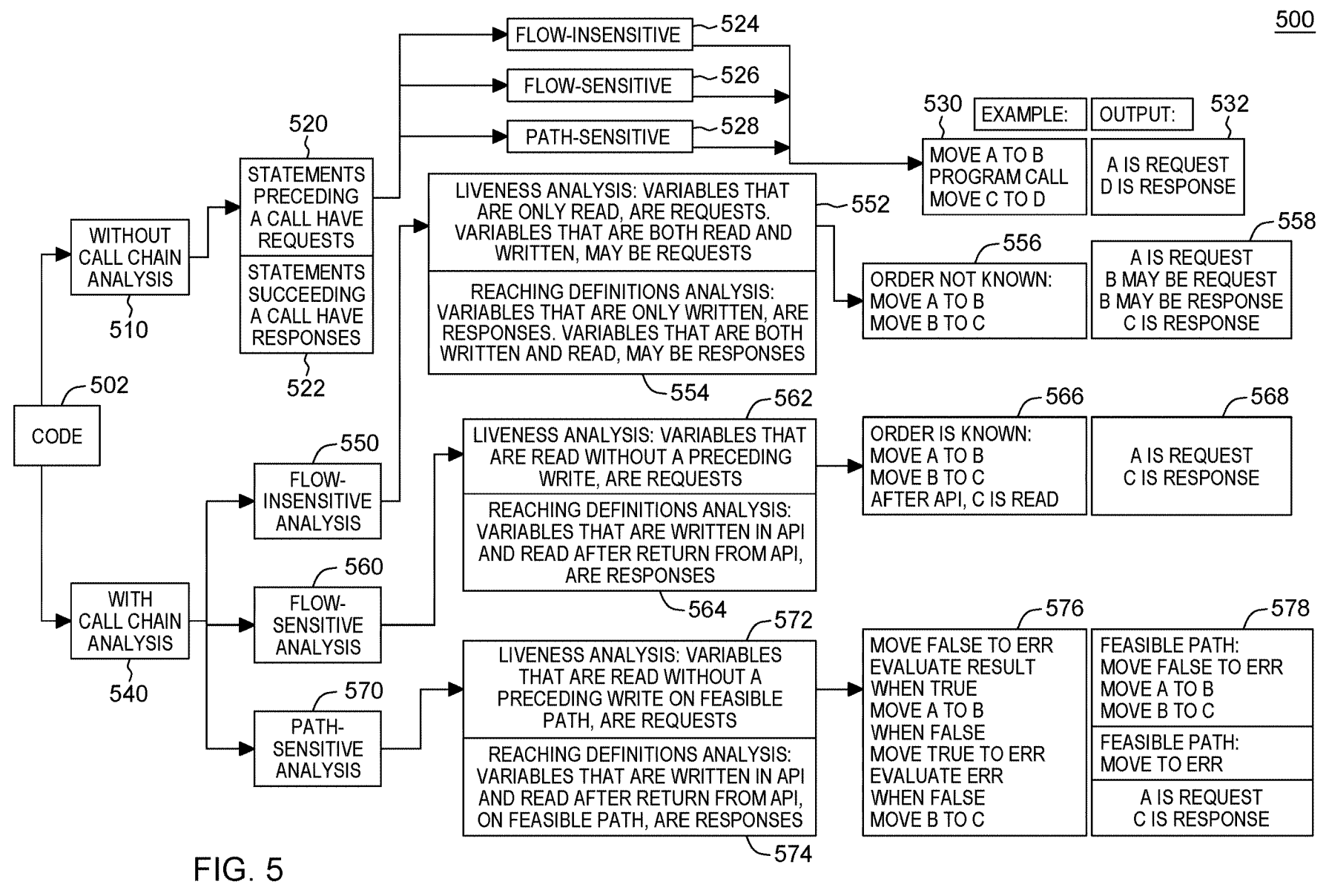

Further details regarding analysis used to identify (e.g., automatically) requests/responses of a code block are described with reference to FIG. 5. In one example, an analysis process (e.g., an analysis process 500) is used. This process may be implemented using a sub-module (e.g., determine requests/responses sub-module 220 and/or additional, other sub-modules) and is executed by one or more computing devices (e.g., one or more computers (e.g., computer(s) 101, other computer(s), etc.), one or more servers (e.g., server(s) 104, other server(s), etc.), one or more processor(s), node(s) and/or processing circuitry, etc. (e.g., of processor set 110 or other processor sets), and/or other computing devices, etc.). Although example computing devices, computers, servers, processors, nodes and/or processing circuitry are provided, additional, fewer and/or other computers, servers, processors, nodes, processing circuitry and/or computing devices may be used for the analysis process and/or other processing. Various options are possible.

As shown, analysis process 500 (also referred to as process 500) obtains code 502 to be exposed as an application programming interface. Process 500 determines whether the analysis (e.g., static analysis) is to be performed without call chain or with call chain analysis. For instance, process 500 may have an indication of whether the application (e.g., monolithic application 302) has clean programming calls, and thus, whether call chain analysis is to be used. As another example, process 500 analyzes the code block to determine whether the code has clean programming calls. Other examples are also possible.

Should the indication or analysis indicate the application or code has clean programming calls, process 500 performs 510, e.g., static analysis without call chain analysis. That is, statements preceding a call have requests 520 and statements succeeding a call have responses 522, and therefore, call chain analysis is not used, in one example. However, flow-insensitive 524, flow-sensitive 526 or path-sensitive 528 analysis may be selected based on, e.g., one or more predefined rules or other techniques. One example of a code portion and identified request(s)/response(s) for the code analyzed without call chain analysis using any of analyses 524-528 is provided below.

In one example, if a portion of code 530 includes the following statements:

Move A to B

Program Call

Move C to D

Then, in one example, an output 532 indicates that A is a request and D is a response. Other examples are possible.

Returning to obtaining code 502, if the indication or analysis indicates the application or code does not include clean programming calls, then process 500 performs 540, e.g., static with call chain analysis. Further, in accordance with one or more aspects, process 500 selects (or is provided an indication of) a further type of static analysis to be used. If process 500 chooses a flow-insensitive analysis 550, then, in one example, a liveness analysis 552 is performed and variables that are only read variables are requests, and variables that are both read and written may be requests. Further, in one example, a reaching definitions analysis 554 is performed and variables that are only written variables are responses, and variables that are both written and read may be responses. In one example, assume the following code 556:

Order unknown:

Move A to B

Move B to C

Based on the code and selected analysis, in one example, an output 558 indicates that A is a request, B may be a request, B may be a response and C is a response. Other examples are possible.

If process 500 chooses a flow-sensitive analysis 560, then, in one example, process 500 performs a liveness analysis 562 and variables that are read without a preceding write are requests. Further, process 500 performs a reaching definitions analysis 564 and variables that are written in an application programming interface and read after a return from an application programming interface are responses. In one example, assume the following code 566:

Order is known:

Move A to B

Move B to C

After API, C is read

Based on the code and selected analysis, in one example, an output 568 indicates that A is a request and C is a response. Other examples are possible.

If process 500 chooses a path-sensitive analysis 570, then, in one example, process 500 performs a liveness analysis 572 and variables that are read without a preceding write on a feasible path are requests. Further, process 500 performs a reaching definitions analysis 574 and variables that are written in an application programming interface and read after a return from an application programming interface on a feasible path are responses. In one example, assume the following code 576:

Move false to err
Evaluate result
   When true
      Move A to B
   When false
      Move true to err
Evaluate err
   When false
      Move B to C Based on the code and selected analysis, in one example, an output 578 includes one feasible path: move false to err, move A to B, move B to C; and another feasible path: move true to err. Further, A is a request and C is a response. Other examples are possible.

As described herein, in one or more aspects, a capability is provided to (e.g., automatically) identify one or more application programming interfaces to be implemented for a selected application, such as a monolithic application. Application programming interfaces allow developers to have programmatic interactions between application modules. Therefore, when building an application, the different application programming interfaces of the application are defined. However, during modernization of existing applications (e.g., creating microservices from monolithic applications, such as mainframe COBOL programs), new application programming interfaces are to be identified from the existing code.

In accordance with one or more aspects, application programming interfaces are identified in existing applications by, for instance, automatically identifying one or more artifacts to be exposed or implemented as application programming interfaces. These artifacts include, for instance, transactions, screens, rules, inter-microservices calls, calls made from outside the application, data accesses, control flow blocks, procedures and/or user defined artifacts, to name some examples. Code of an artifact is analyzed to determine one or more requests/responses of the code. A definition file is generated for the code and includes schema definitions for the determined requests/responses. Caller code of the application is refactored such that calls of the caller code are application programming interface calls. This includes performing byte alignment to map bytes of the data structures and to map arguments of the application to parameters in program calls. Calls in the application are refactored to, e.g., call communication stubs of a connect tool used to call the implemented application programming interfaces. The connect tool exposes the application programming interfaces using the definition files and provides the communication stubs.

Figure 6A:
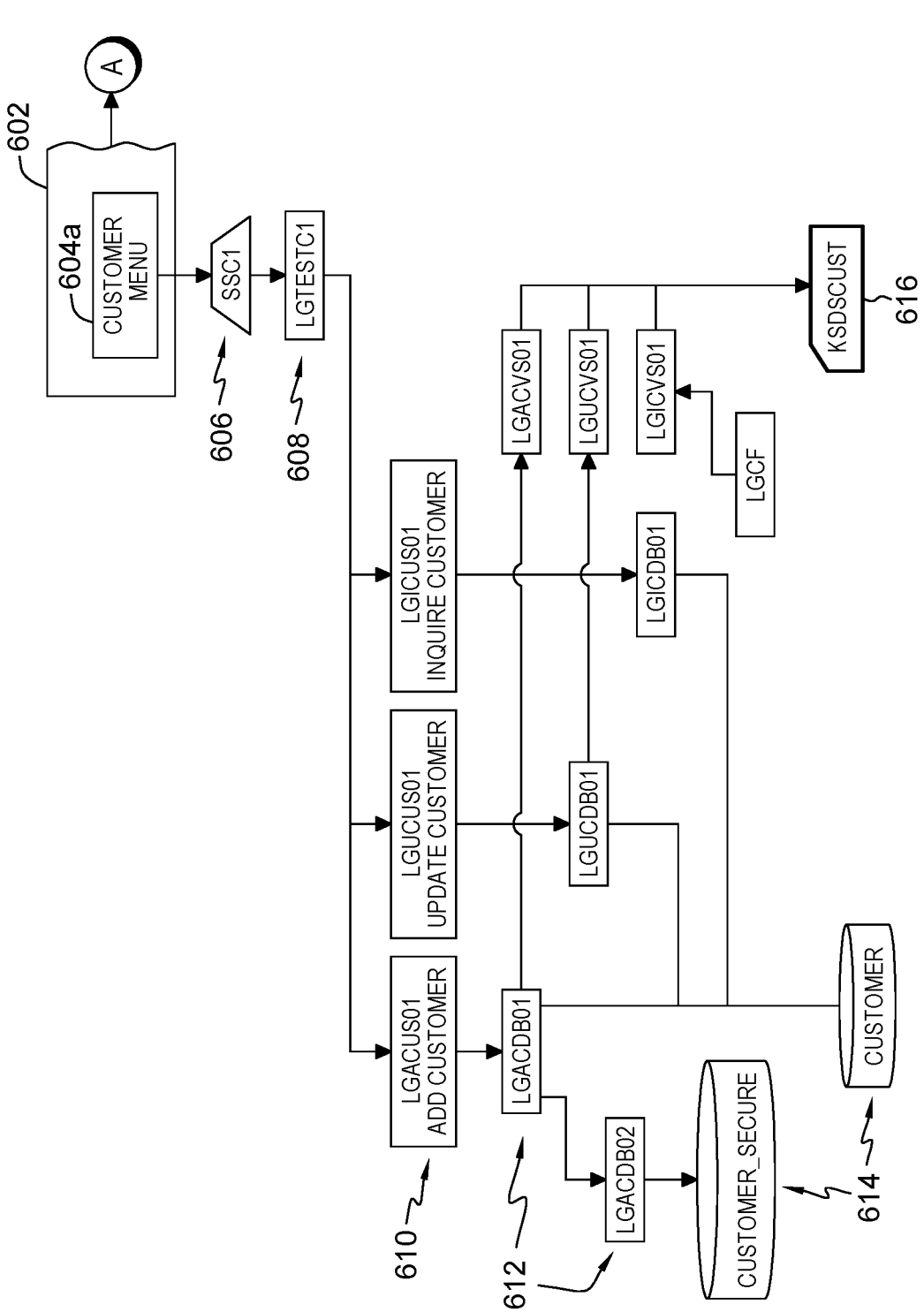
FIGS. 6A-6B depict one example of using one or more aspects of the present invention.
Figure 6B:
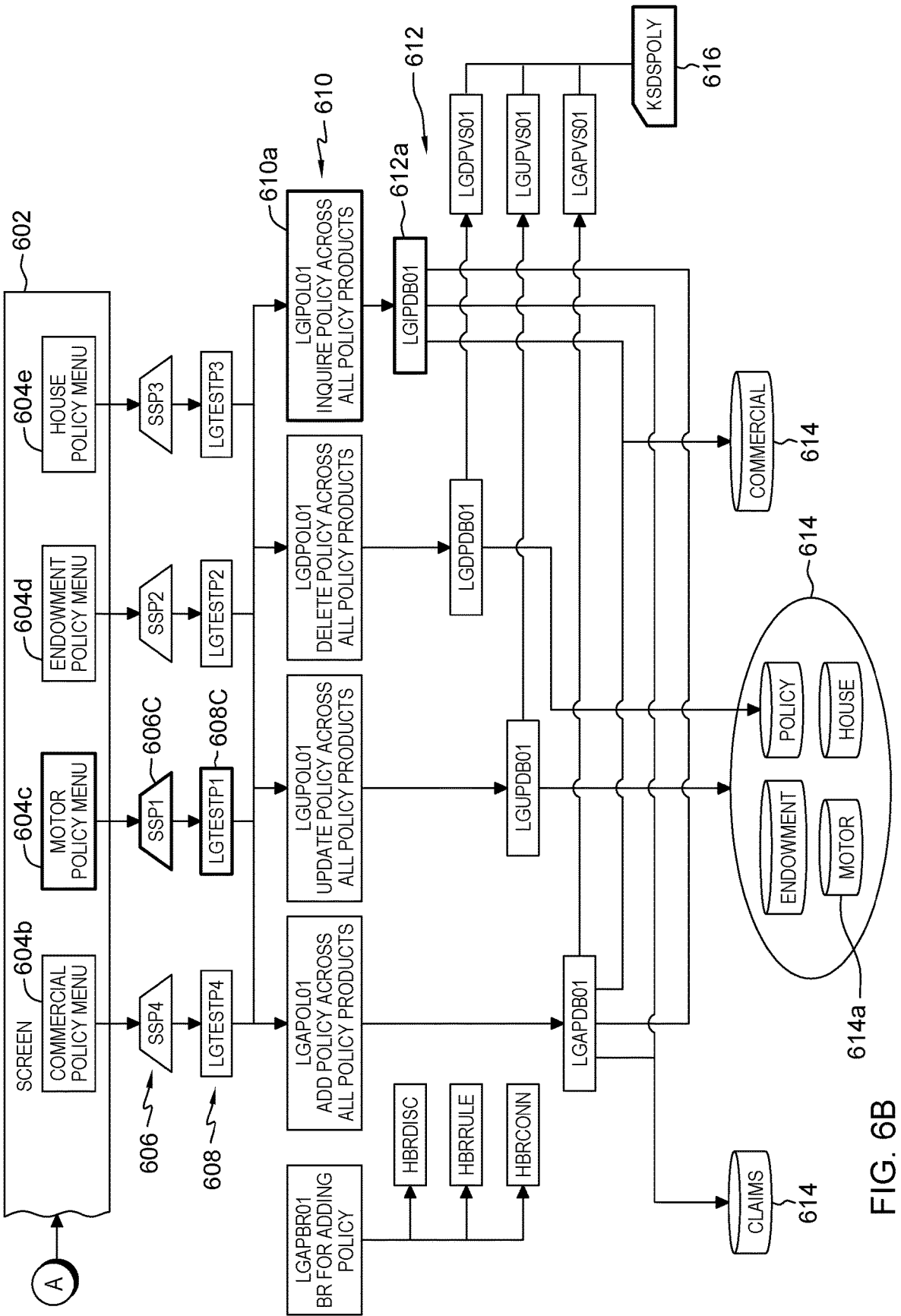

One example of a monolithic application in which one or more aspects of the present invention may be used to identify (e.g., automatically) application programming interfaces of the application is a general application that includes customer and policy management. One example of a control flow of such an application is depicted in FIGS. 6A-6B. Many different control flows may be shown and use one or more aspects of the present invention.

As shown, in one example, an application 600 includes a screen 602 providing a plurality of menus, including, for instance, a customer menu 604a (FIG. 6A) and multiple policy menus 604b-604e (FIG. 6B). Based on selecting a menu, a transaction 606 is initiated, and a transaction 606 calls a program 608 which executes one or more operations 610. An operation may call one or more database operations 612 to perform an operation on one or more databases 614. Operations may also be performed on one or more files 616.

As one particular example, for instance, based on selecting, e.g., motor policy menu 604c (FIG. 6B), a transaction 606c is initiated. Transaction 606c calls one or more programs 608, such as a program 608c. Program 608c executes one or more operations 610 including an operation 610a. Operation 610a is, e.g., an inquire operation that calls one or more database operations 612 (e.g., operation 612a) to perform the inquire operation on a database 614 (e.g., database 614a). Other paths and examples are possible.

In the example application of FIGS. 6A-6B, there are a number of artifacts that may be used to identify application programming interfaces for application 600, including, as examples, a screen (e.g., screen 602); one or more transactions 606 (e.g., transaction 606c and/or other transactions of the application); one or more calls (e.g., calls to programs, calls to operations and/or calls to database operations); output of one or more design tools; one or more rules; and/or data access. Additional, fewer and/or other artifacts may be identified in other examples.

In the example code below, which represents, e.g., motor screen 604c of FIG. 6B (e.g., '01MOT' below) triggering program 608c (e.g., LGTESTP1) to call a database program (e.g., LGIPOLO1), control flow block '01IMOT' and control flow block 'LGIPOLO1' are exported as application programming interfaces, in accordance with one or more aspects of the present invention:

```
79    EVALUATE ENP1OPTO
80
81    WHEN '1'
82       Move '01IMOT'                        To      CA-REQUEST-ID
83       Move ENP1CNOO                         To      CA-CUSTOMER-NUM
84       Move ENP1PNOO                         To      CA-POLICY-NUM
85       EXEC CICS LINK PROGRAM ('LGIPOL01')
86                                                     COMMAREA (COMM-AREA)
87                                                     LENGTH (32500)
88       END-EXEC
89       IF CA-RETURN-CODE > 0
90          GO TO NO-DATA
91       END-IF
92
```

-continued

| 93 | Move CA-ISSUE-DATE | To | ENP1IDAI |
|---|---|---|---|
| 94 | Move CA-EXPIRY-DATA | To | ENP1EDAI |
| 95 | Move CA-M-MAKE | To | ENP1CMKI |
| 96 | Move CA-M-MODEL | To | ENP1CM0I |
| 97 | Move CA-M-VALUE | To | ENP1VALI |
| 98 | Move CA-M-REGNUMBER | To | ENP1REGI |
| 99 | Move CA-M-COLOUR | To | ENP1COLI |
| 100 | Move CA-M-CC | To | ENP1CCI |
| 101 | Move CA-M-MANUFACTURED | To | ENP1MANI |
| 102 | Move CA-M-PREMIUM | To | ENP1PREI |
| 103 | Move CA-M-ACCIDENTS | To | ENP1ACCI |
| 104 | EXEC CICS SEND MAP ('SSMAPP1') | | |
| 105 | | FROM (SSMAPP1O) | |
| 106 | | MAPSET ('SSMAP') | |
| 107 | END-EXEC | | |
| 108 | GO TO ENDIT-STARTIT | | |

Using the above example, automatic detection of requests and responses is performed. For instance, assuming code lines p to q (e.g., code lines 82-108) are to be exposed as an application program interface, requests and responses are determined. In one example:

Requests (also referred to as request fields) for lines p to q: In one example, use liveness analysis, which marks field f as a request field if some path from p to q contains an r-value occurrence of f (i.e., read of f) which is not preceded by an 1-value occurrence of f (i.e., write to f).

Responses (also referred to as response fields) for lines p to q: In one example, use reaching definitions analysis, which marks field f as a response field if some path from p to q contains an 1-value occurrence of f (i.e., read of f) and if some path from q to application exit contains an r-value occurrence of f (i.e., write to f).

Further, a surety of requests-responses on each field may be marked with a boolean flag optional, an example of which is described below.

If field f is only read along paths from p to q, then it means that f is a request field, for sure. Mark optional flag as false.

If field f is only written along paths from p to q, then it means that f is a response field, for sure. Mark optional flag as false.

If field f is both read and written along paths from p to q, then it means that f may or may not be a request and response field. Mark optional as true. The user may manually verify, or an automated technique may be used to verify, as examples, whether to mark the field f as request and/or response.

In one example, given code lines p to q to be implemented as an application programming interface, control and data flow paths from p to q are traversed to find requests and responses. Example traversal variants include, for instance:

Without call chain analysis: If there is a program call along some path from p to q, the code in the called program is not analyzed. It is assumed that the request fields can be computed from the code lines preceding the program call and the response fields can be computed from the code lines succeeding the program call. This variant can be used when the application has clean program calls with requests in the preceding lines and responses in the succeeding lines. For example, in the code snippet of lines 82-108, there is a program call to LGIPOLO1. The lines preceding the program call contain the request fields and the lines succeeding the program call contain the response fields.

With call chain analysis: If the monolithic application does not have clean program calls, i.e., requests and responses could be spread and may be inside the called programs, then this variant is used. Here, code lines in the called program are analyzed to find the requests and responses. This is performed recursively and fixpoint computation of the requests and responses may be performed.

In each analysis technique (e.g., without and with call chain analysis), the following three variants of static data flow analysis may be used, in one example. These are listed in ascending order of precision and execution time to compute the requests and responses.

Flow-insensitive analysis: Fields that are read are request fields. Fields that are written are response fields.

Flow-sensitive analysis: Fields that are read without a preceding write are request fields. Fields that are written in the application programming interface and read after return from the application programming interface, are response fields.

Path-sensitive analysis: Fields that are read without a preceding write on feasible paths from p to q are request fields. Fields that are written in the application programming interface and read after return from the application programming interface on feasible paths from p to q, are response fields. Feasible paths are control flow paths computed based on the values of the conditional statements computed statically.

In the below example, which is for the code snippet above, request/response detection is performed without call chain analysis. Example requests/responses for this example include:

```
LGTESTP1__82__109:
    requests:
        LGTESTP1:
            SSMAPP1O:
                ENP1CN00:
                    pic:            "X(10)"
                    optional:       false
                ENP1PN00:
                    pic:            "X(10)"
                    optional:       false
    responses:
        LGTESTP1:
            SSMAPP1I:
                ENP1MANI:
                    pic:            "X(10)"
                    optional:       false
```

-continued

```
        ENP1C0LI:
            pic:             "X(8)"
            optional:        false
        ENP1VALI:
            pic:             "X(6)"
            optional:        false
        ENP1CMKI:
            pic:             "X(20)"
            optional:        false
        ENP1EDAI:
            pic:             "X(10)"
            optional:        false
        ENP1IDAI:
            pic:             "X(10)"
            optional:        false
```

In another example, the detection is performed with call chain analysis. Example requests/responses for this example include:

```
LGTESTP1__82__109:
    requests:
        LGTESTP1:
            COMM-AREA:
                CA-POLICY-REQUEST:      {...}
                CA-RETURN-CODE:         {...}
                CA-CUSTOMER-NUM:        {...}
                CA-REQUEST-ID:
                    pic:                "X(6)"
                    optional:           true
            SSMAPP10:
                ENP1CN00:
                    pic:                "X(10)"
                    optional:           false
                ENP1PN00:
                    pic:                "X(10)"
                    optional:           false
    responses:
        LGTESTP1:
            COMM-AREA:
                CA-POLICY-REQUEST:      {...}
                CA-RETURN-CODE:         {...}
                CA-REQUEST-ID:
                    pic:                "X(6)"
                    optional:           true
                CA-CUSTOMER-NUM:        {...}
            SSMAPP1I:
                ENP1CMKI:
                    pic:                "X(20)"
                    optional:           false
                ENP1CM0I:               {...}
                ENP1C0LI:               {...}
                ENP1ACCI:               {...}
```

As described herein, in one or more aspects, a capability is provided to (e.g., automatically) identify one or more application programming interfaces for a selected application, such as a monolithic application. In one example, an application programming interface is identified for each control block that, e.g., calls a program, has a database access and/or checks returned status. Further, an application programming interface is identified and produced for each procedure. Other examples are possible.

In one embodiment, an application programming interface identified in accordance with one or more aspects is indicated as, e.g., a GET/POST/INPUT/DELETE depending on the operation in the application programming interface. An appropriate name for the application programming interface may be found using, e.g., natural language processing on the comments and/or code of the application programming interface. Other variations are possible.

One or more aspects of the capability automatically identify and/or implement one or more application programming interfaces for, e.g., mainframe code that is monolithic in that a single program encompasses multiple functions. Since it is monolithic with multiple functions, identification of application programming interfaces for specific functions is challenging. For instance, within a program, code blocks addressing a function are written as sections, paragraphs or procedures and the passing of fields between these code blocks is not very intuitive to be able to identify the application programming interfaces. Further, a single data store may hold multiple different data structures. For example, a VSAM (virtual storage access method) file may hold records of different types in which one layout/structure is redefined multiple times. Thus, identifying which type of record is written by which code block is complex. Moreover, the manner in which mainframe screens (e.g., user interfaces (UIs)) interact/interface with back-end logic is different from how web screens (e.g., graphical user interfaces (GUI)) interact. Thus, data exchanged between user-facing screens and the back-end processing is to be accurately captured. One or more aspects of the present invention address the above by automatically identifying application programing interfaces for the program.

In one or more aspects, the application programming interfaces may be used for microservices created from the monolithic application and/or for other programs, applications, code, modules, etc. Application programming interfaces enable developers to have programmatic interactions between one or more of programs/applications and/or businesses. One or more aspects provide code modernization in which functions of monolithic applications can be used external to the monolithic application and/or external to mainframe computers.

One or more aspects of the present invention, including the automatic identification of application programming interfaces, are useful in many use cases, including the following, which are just a few examples; many other examples are possible:

Replace mainframe screens with modernized user interfaces. This includes the following automated steps, as an example: list the screens and transactions; identify the copybooks and fields used; identify the transactions as application programming interfaces; and based on client input, as an example, create a user interface to call the application programming interfaces.

Extract services. This includes the following automated steps, as an example: identify functionality to be exposed with input of, e.g., subject matter experts or automatically provided input (e.g., input from artificial intelligence); identify code relevant to the functionality; extract relevant functional slice from the code; identify the code as an application programming interface and find the requests and responses; refactor the caller code to enable communication with the generated services.

Extract business rules as external services to be executed by a rule engine. This includes the following automated steps, as an example: identify code blocks containing business rules using business rules extraction tools.

Refactor monolithic application into candidate microservices. This includes the following automated steps, as an example: split the application into functional modules with optionally, e.g., input of subject matter experts or automatically provided input (e.g., input from artificial intelligence); identify internal services, i.e., code used by different functional modules; identify external services; identify application programming interfaces for the code and find the requests and responses; refactor the caller code to enable communication with the generated services.

Map application capabilities to domain model and bridge the functional gaps. This includes the following automated steps, as an example: map domain keywords to program artifacts, like tables, program names, screens, etc., using, e.g., a mapping system or other system; map the domain aligned program artifacts to domain ontology, using, e.g., a mapping system or other system; generate skeleton application programming interfaces for the domain ontology; complete the application programming interfaces, e.g., with input of, e.g., business architects, subject matter experts or automatically provided input (e.g., input from artificial intelligence).

Although various use cases are provided, additional, fewer and/or other use cases are possible. Further, although various examples are provided herein, other examples/embodiments are possible. For example, other types of analyses may be performed and/or additional, fewer and/or other artifacts may be chosen to be used to identify and/or implement application programming interfaces.

One or more aspects of the present invention are tied to computer technology and facilitate processing within a computer, improving performance thereof. For instance, applications may be automatically modernized providing application programming interfaces for an application. This allows functions of an application to be automatically determined and application programming interfaces be identified for those functions. By automating one or more aspects, accuracy in application programming interface development is increased and the amount of application and/or development knowledge needed is decreased. Processing within a processor, computer system and/or computing environment is facilitated.

One or more aspects may use and/or benefit from machine learning. For instance, a machine learning training system may be utilized, in one or more aspects, to perform cognitive analyses of various inputs, including input data, data from one or more data structures and/or other data for an event (e.g., to identify artifacts to be exposed as application programming interfaces, to identify requests/responses of the artifacts and/or select analysis techniques, as examples). Program code in embodiments of the present invention may perform cognitive analysis to generate one or more training data structures, including algorithms utilized by the program code to predict states of a given event. Training models may be generated and used for prediction. These models may be updated (e.g., continuously, periodically) based on, e.g., selections made, etc. Many variations are possible.

In one example, a model generated by the program code is automatically updated by the program code based on active event feedback, as well as from the feedback received from data related to the event. For example, when the program code determines that there is a constraint, event or pattern that was not previously predicted by the model, the program code utilizes a learning agent to update the model to reflect the state of the event, in order to improve predictions in the future. Additionally, when the program code determines that a prediction is incorrect, either based on receiving user feedback through an interface or based on monitoring related to the event, the program code updates the model to reflect the inaccuracy of the prediction for the given period of time. Program code comprising a learning agent cognitively analyzes the data deviating from the modeled expectations and adjusts the model to increase the accuracy of the model, moving forward.

In one or more embodiments, program code, executing on one or more processors, utilizes an existing cognitive analysis tool or agent (now known or later developed) to tune the model, based on data obtained from one or more data sources. In one or more embodiments, the program code interfaces with certain application programming interfaces to perform a cognitive analysis of obtained data. Specifically, in one or more embodiments, certain application programming interfaces comprise a cognitive agent (e.g., learning agent) that includes one or more programs, including, but not limited to, natural language classifiers, a retrieve and rank service that can surface the most relevant information from a collection of documents, concepts/visual insights, trade off analytics, document conversion, and/or relationship extraction. In an embodiment, one or more programs analyze the data obtained by the program code across various sources utilizing one or more of a natural language classifier, retrieve and rank application programming interfaces, and trade off analytics application programming interfaces. An audio-type application programming interface can also provide audio related application programming interface services, in the event that the collected data includes audio, which can be utilized by the program code, including but not limited to natural language processing, text to speech capabilities, and/or translation.

In one or more embodiments, the program code utilizes a neural network to analyze event-related data to generate the model utilized to predict the state of a given event at a given time. Neural networks are a biologically-inspired programming paradigm which enable a computer to learn and solve artificial intelligence problems. This learning is referred to as deep learning, which is a subset of machine learning, which is an aspect of artificial intelligence. It includes a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in multiple source processing, which the program code in one or more embodiments accomplishes when obtaining data and generating a model for predicting states of a given event.

Although various aspects and/or embodiments are described herein, other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different techniques may be used to identify artifacts, requests/responses and/or application programming interfaces to be implemented. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:

automatically identifying, using a computing device of the computing environment, one or more application programming interfaces to be implemented for an application, wherein the automatically identifying includes determining within the application one or more artifacts to be implemented as the one or more application programming interfaces;

determining, for an artifact of the one or more artifacts, one or more requests of the artifact, the one or more requests being a part of an application programming interface signature for an application programming interface identified based on the artifact, and wherein the determining the one or more requests of the artifact includes automatically selecting, based on a control flow of the application and a type of program calls of the application, an analysis technique to be used to determine the one or more requests, wherein the analysis technique is automatically selected from a set of analysis techniques including a static with call chain analysis technique and a static without call chain analysis technique;

performing byte alignment on code of a code block of the artifact to identify how information is to be transferred between the application and the application programming interface; and generating, for the application programming interface identified based on the artifact, one or more definitions, the one or more definitions including one or more request definitions for the one or more requests of the artifact.

2. The computer-implemented method of claim 1, further comprising determining for the artifact one or more responses of the artifact, and wherein the one or more definitions include one or more response definitions for the one or more responses.

3. The computer-implemented method of claim 1, wherein the artifact is one artifact selected from a group of artifacts consisting of transactions, screens, procedures, data access, rules and program calls.

4. The computer-implemented method of claim 1, further comprising refactoring by executing program instructions stored in memory, calling code of the application to modify the application to call the one or more application programming interfaces instead of original code of the application.

5. The computer-implemented method of claim 1, further comprising identifying, for the artifact, code to be exposed for the application programming interface identified based on the artifact, and wherein the determining includes determining, based on the code, the one or more requests and one or more responses for the artifact.

6. The computer-implemented method of claim 5, wherein the determining the one or more responses comprises selecting, based on the control flow of the application, a technique to be used to determine the one or more responses.

7. The computer-implemented method of claim 6, wherein the determining the one or more responses further comprises using the technique to automatically determine the one or more responses.

8. The computer-implemented method of claim 6, wherein the technique includes the static with call chain analysis technique based on the application having a defined type of program calls.

9. The computer-implemented method of claim 6, wherein the technique includes the static without call chain analysis technique based on the application having a determined type of program calls.

10. The computer-implemented method of claim 1, further comprising:

determining one or more arguments of a calling program defined from the application;

determining one or more parameters of artifact code of at least one artifact of the one or more artifacts; and performing byte alignment between the one or more arguments and the one or more parameters to align the calling program and a called program that includes the artifact code.

11. The computer-implemented method of claim 1, further comprising, based on performing the selected analysis technique, determining, for the artifact, one or more responses of the artifact, and wherein the determining the one or more requests comprises using a liveness analysis to identify variables that are read without a preceding write, and wherein the determining the one or more responses includes using a reaching definitions analysis to identify variables that are written and read after return from a path of the application programing interface.

12. A computer system for facilitating processing within a computing environment, the computer system comprising:

a memory; and a computing device in communication with the memory, wherein the computer system is configured to perform a method, said method comprising:

automatically identifying, using the computing device, one or more application programming interfaces to be implemented for an application, wherein the automatically identifying includes determining within the application one or more artifacts to be implemented as the one or more application programming interfaces;

determining, for an artifact of the one or more artifacts, one or more requests of the artifact, the one or more requests being a part of an application programming interface signature for an application programming interface identified based on the artifact and wherein the determining the one or more requests of the artifact includes automatically selecting, based on a control flow of the application and a type of program calls of the application, an analysis technique to be used to determine the one or more requests, wherein the analysis technique is automatically selected from a set of analysis techniques including a static with call chain analysis technique and a static without call chain analysis technique;

performing byte alignment on code of a code block of the artifact to identify how information is to be transferred between the application and the application programming interface; and generating, for the application programming interface identified based on the artifact, one or more definitions, the one or more definitions including one or more request definitions for the one or more requests of the artifact.

13. The computer system of claim 12, wherein the method further comprises determining for the artifact one or more responses of the artifact, and wherein the one or more definitions include one or more response definitions for the one or more responses.

14. The computer system of claim 12, wherein the method further comprises refactoring, by executing program instructions stored in memory, calling code of the application to modify the application to call the one or more application programming interfaces instead of original code of the application.

15. The computer system of claim 12, wherein the method further comprises identifying, for the artifact, code to be exposed for the application programming interface identified based on the artifact, and wherein the determining includes determining, based on the code, the one or more requests and one or more responses for the artifact.

16. A computer program product for facilitating processing within a computing environment, the computer program product comprising:

one or more computer readable storage media and program instructions collectively stored on the one or more computer readable storage media to perform a method comprising:

automatically identifying, using a computing device of the computing environment, one or more application programming interfaces to be implemented for an application, wherein the automatically identifying includes determining within the application one or more artifacts to be implemented as the one or more application programming interfaces;

determining, for an artifact of the one or more artifacts, one or more requests of the artifact, the one or more requests being a part of an application programming interface signature for an application programming interface identified based on the artifact, and wherein the determining the one or more requests of the artifact includes automatically selecting, based on a control flow of the application and a type of program calls of the application, an analysis technique to be used to determine the one or more requests, wherein the analysis technique is automatically selected from a set of analysis techniques including a static with call chain analysis technique and a static without call chain analysis technique;

performing byte alignment on code of a code block of the artifact to identify how information is to be transferred between the application and the application programming interface; and generating, for the application programming interface identified based on the artifact, one or more definitions, the one or more definitions including one or more request definitions for the one or more requests of the artifact.

17. The computer program product of claim 16, wherein the method further comprises determining for the artifact one or more responses of the artifact, and wherein the one or more definitions include one or more response definitions for the one or more responses.

18. The computer program product of claim 16, wherein the method further comprises refactoring, by executing program instructions stored in memory, calling code of the application to modify the application to call the one or more application programming interfaces instead of original code of the application.

19. The computer program product of claim 16, wherein the method further comprises identifying, for the artifact, code to be exposed for the application programming interface identified based on the artifact, and wherein the determining includes determining, based on the code, the one or more requests and one or more responses for the artifact.

20. The computer program product of claim 19, wherein the determining the one or more responses comprise selecting, based on the control flow of the application, a technique to be used to determine the one or more responses.

* * * * *